CALENDAR
Filed June 3, 1949 6 Sheets-Sheet 1
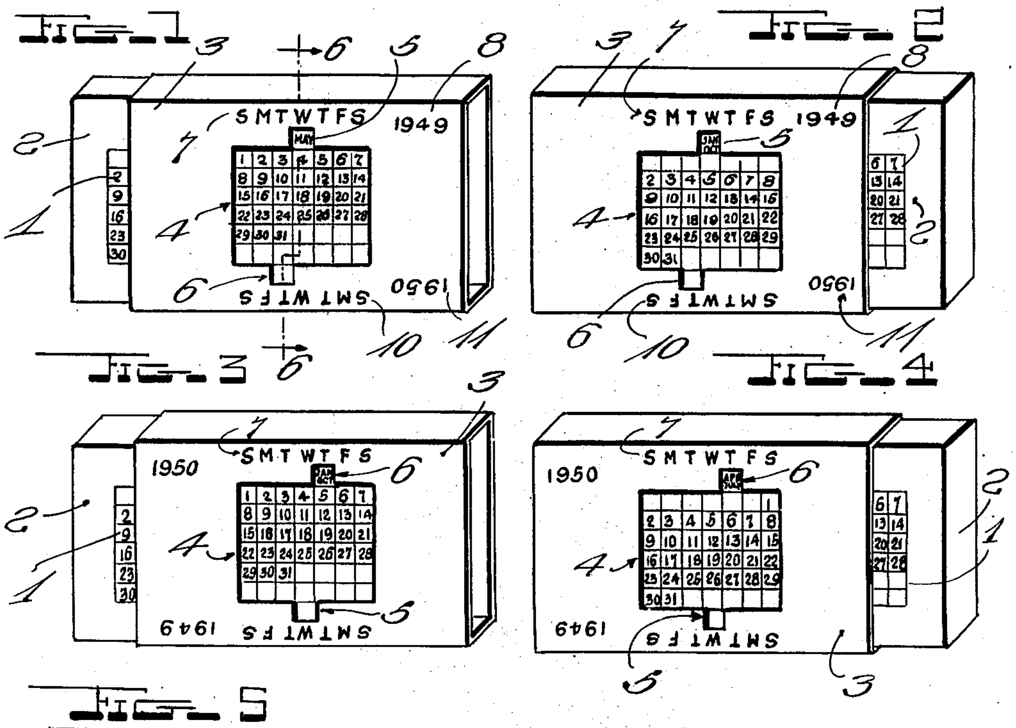
FIG. 1, FIG. 2, FIG. 3, FIG. 4, FIG. 5
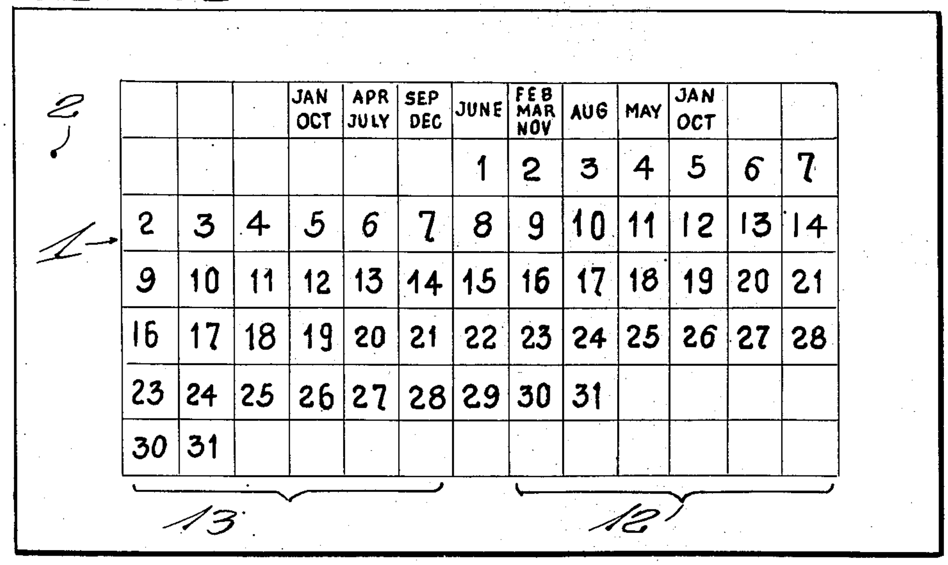
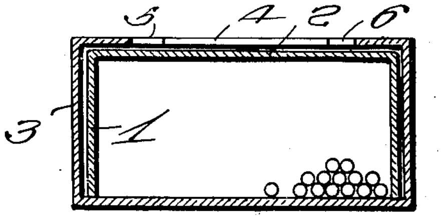
FIG. 6
INVENTOR.
Alfred B. Downs, Jr.
BY John B. Brady
ATTORNEY

CALENDAR

Filed June 3, 1949 6 Sheets-Sheet 2

INVENTOR.
Alfred B. Downs, Jr.
BY
John B. Brady
ATTORNEY

Sept. 9, 1952 A. B. DOWNS, JR 2,609,630

CALENDAR

Filed June 3, 1949 6 Sheets-Sheet 3

INVENTOR.

Alfred B. Downs, Jr.

BY

John B. Brady

ATTORNEY

INVENTOR.
Alfred B. Downs, Jr.
BY John B. Brady
ATTORNEY

CALENDAR

Filed June 3, 1949 6 Sheets-Sheet 5

INVENTOR.
Alfred B. Downs, Jr.
BY
John A. Brady
ATTORNEY

CALENDAR

Filed June 3, 1949 6 Sheets-Sheet 6

INVENTOR.
Alfred B. Downs, Jr.
BY
John B. Brady
ATTORNEY

Patented Sept. 9, 1952

2,609,630

UNITED STATES PATENT OFFICE 2,609,630

CALENDAR

Alfred B. Downs, Jr., Columbus, Miss.

Application June 3, 1949, Serial No. 96,986

6 Claims. (Cl. 40—109)

Figures 7, 8, 9, 10, 11, 12, 13, 14:
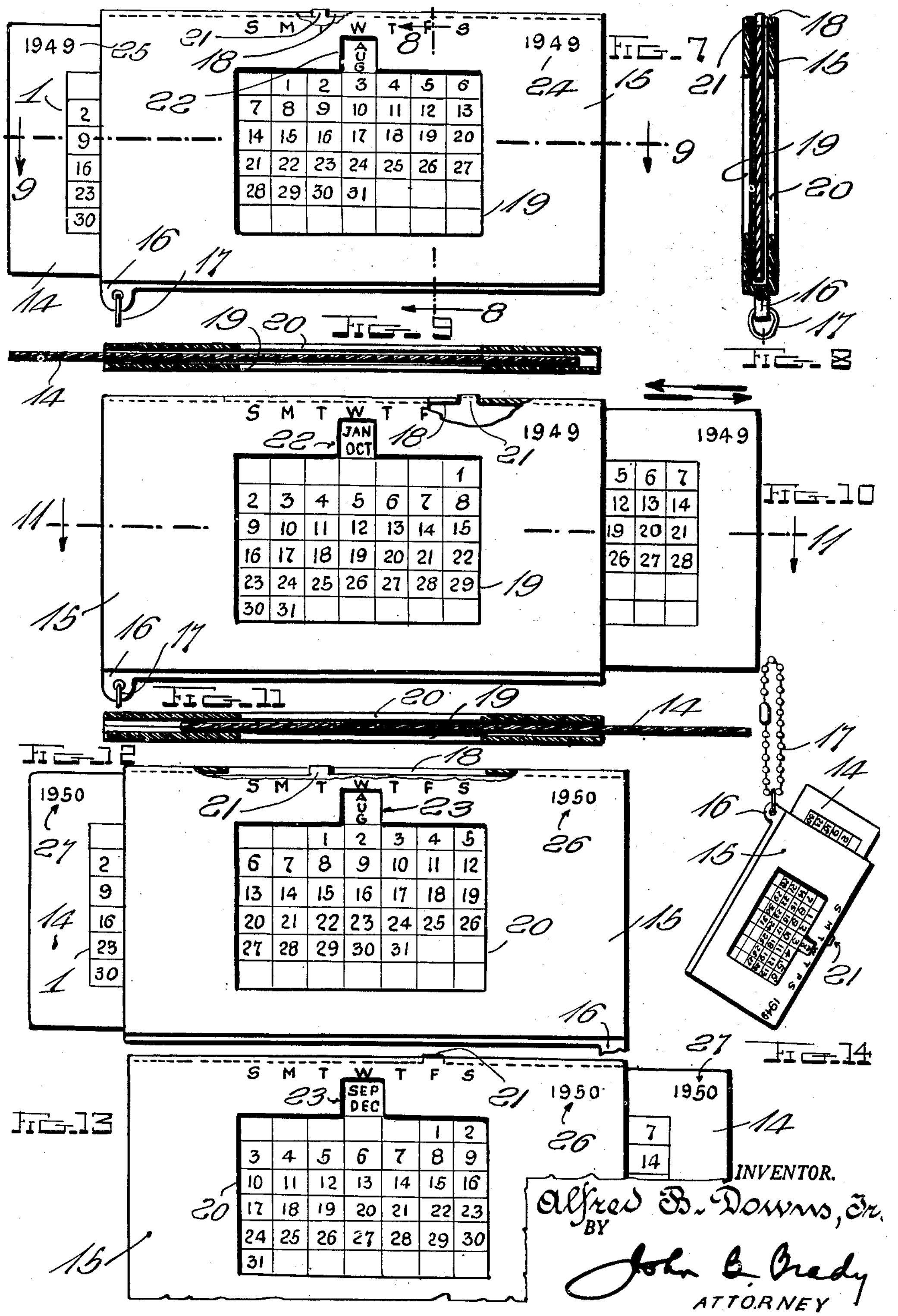

My invention relates broadly to calendars, and more particularly to a type of perpetual calendar which is of simplified construction and which displays the correct calendar for any month of any year to which it is set, this being accomplished automatically without reference to a conventional calendar.

One of the objects of my invention is to provide a simplified construction of perpetual calendar embodying a compact arrangement of date designating means movable with respect to indicia for displaying a designated date in any selected month over a multiplicity of years.

Another object of my invention is to provide a compact construction of perpetual calendar which may be readily manufactured from moldable plastic, paste-board, cardboard, pressed-board, wood, metal, or other materials which substantially enclose all of the operating members of the device.

Another object of my invention is to provide a construction of perpetual calendar having at least one movable or sliding member, each sliding member having equal or proportionate graduations thereon.

Still another object of my invention is to provide a construction of perpetual calendar simple to operate, wherein the desired year is set with one movement and the desired month set with another movement, which two movements automatically exhibit the full calendar for the desired month and year. In certain forms of my invention a third movement is necessary, but in this form the year, month and date are set with one movement each, and the day of the week is automatically indicated.

A further object of my invention is to provide a construction of perpetual calendar with unusual appeal, adaptable as a desk calendar and wall calendar, as well as for innumerable novel applications such as being stamped onto an ordinary matchbox, made into the lid of a pen and pencil case or similar box lid, made into a desk pen stand, made into the base of a clock, formed into a watch chain attachment, and many other applications.

Still another object of my invention is to provide a mathematical arrangement for the dates of the month on a slidable member associated with a perpetual calendar, with these dates so associated with a columnar arrangement of month headings that the column by translatory movement may be displayed as a perpetual calendar in relation to an associated year designation.

Still another object of my invention is to provide a formula for arranging the dates of the month on a calendar card in association with month and year designations, wherein the total of a selected year number, plus a selected month number, plus a selected day of the month number, produces a sum equal to a day of the week number, which, translated into a mechanical arrangement, enables perpetual calendars to be constructed on a mass production scale at low cost.

Figures 15, 16, 17, 18, 19, 20:
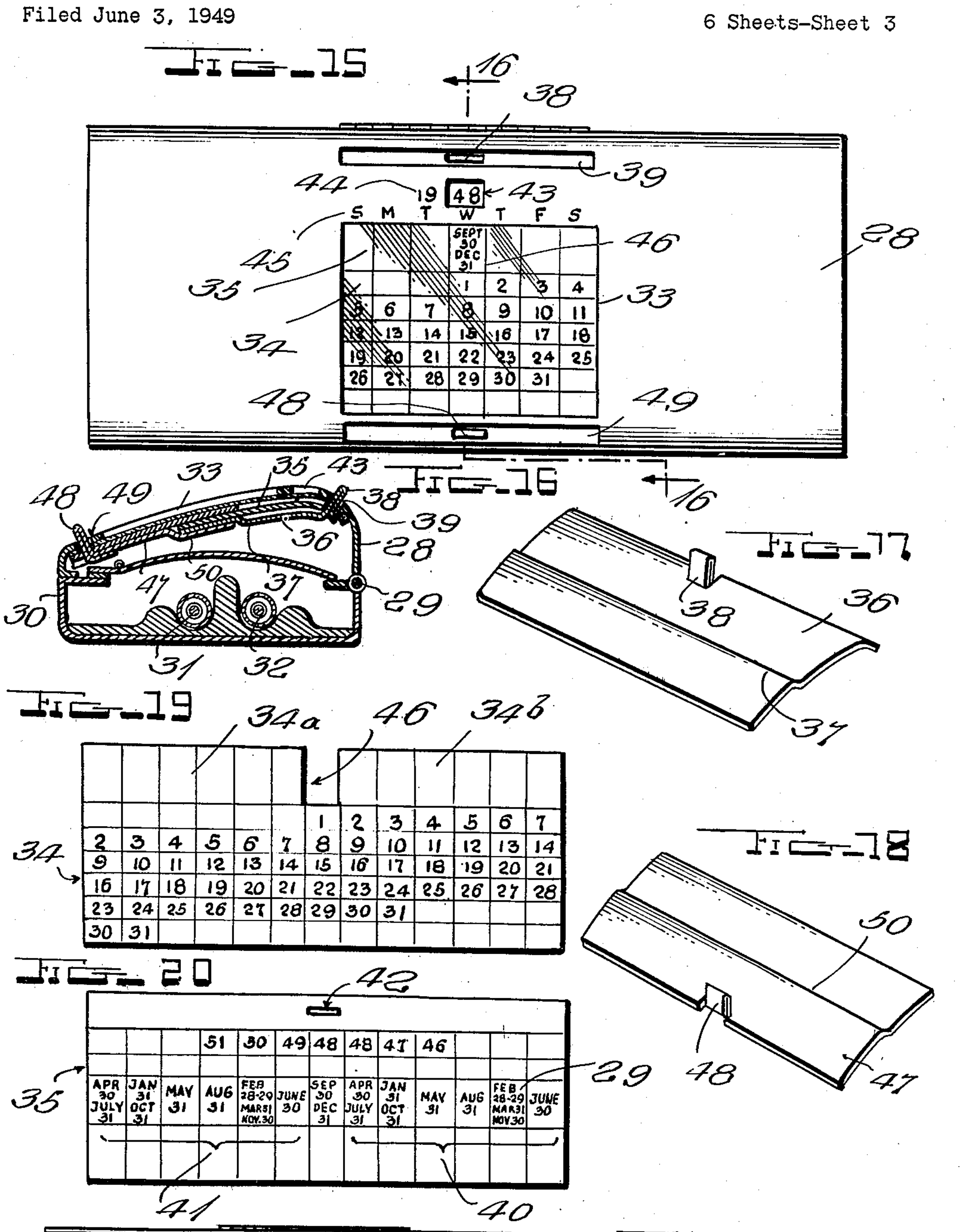
Figure 21:
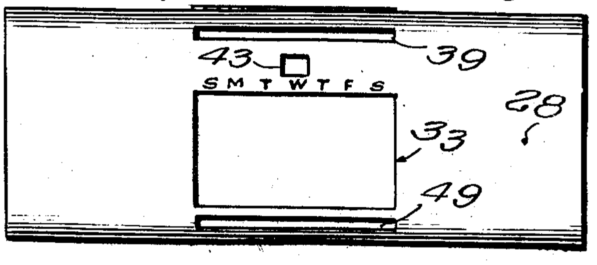
Figures 22, 23, 24, 25, 26, 27, 28:
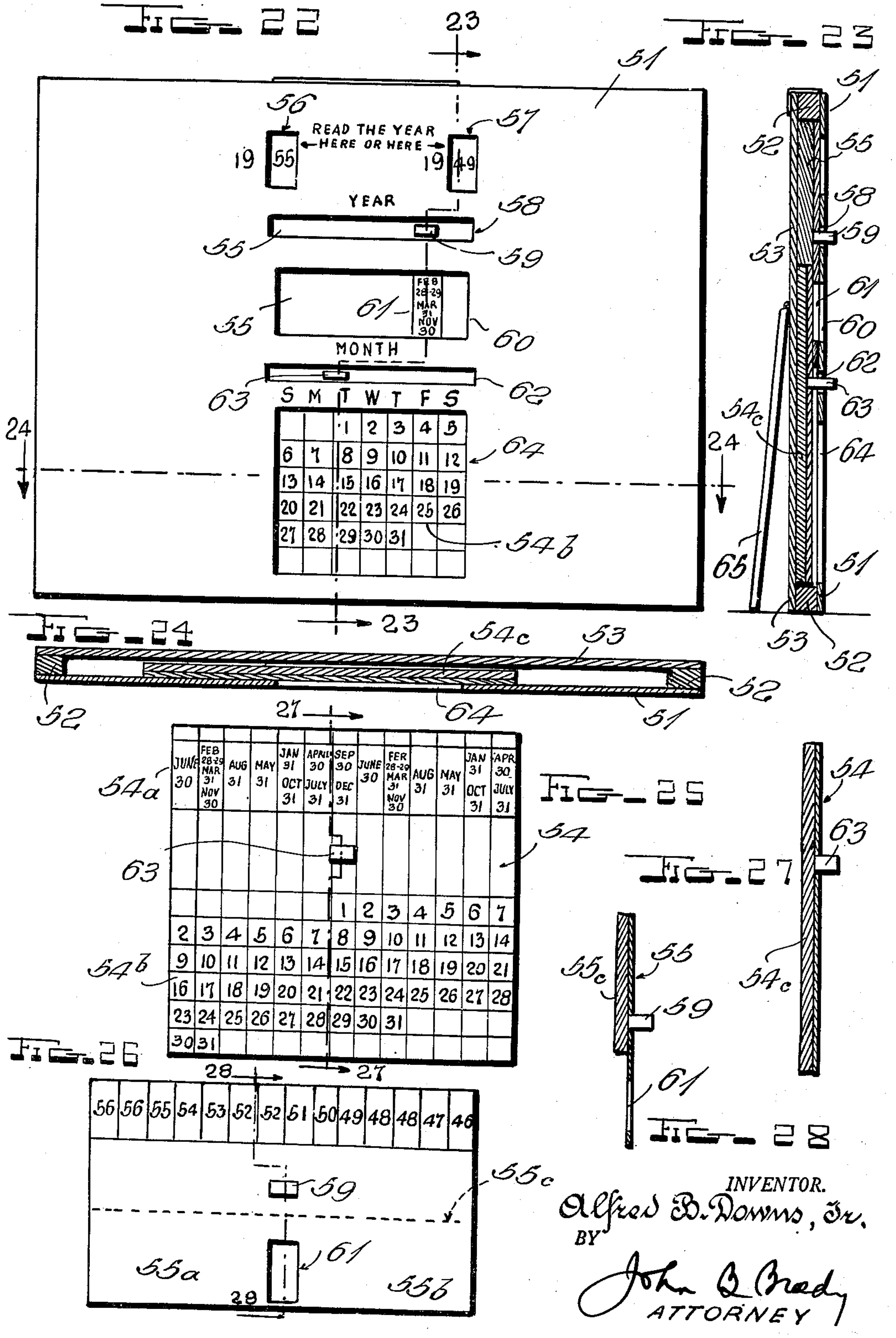
Figures 29, 30:
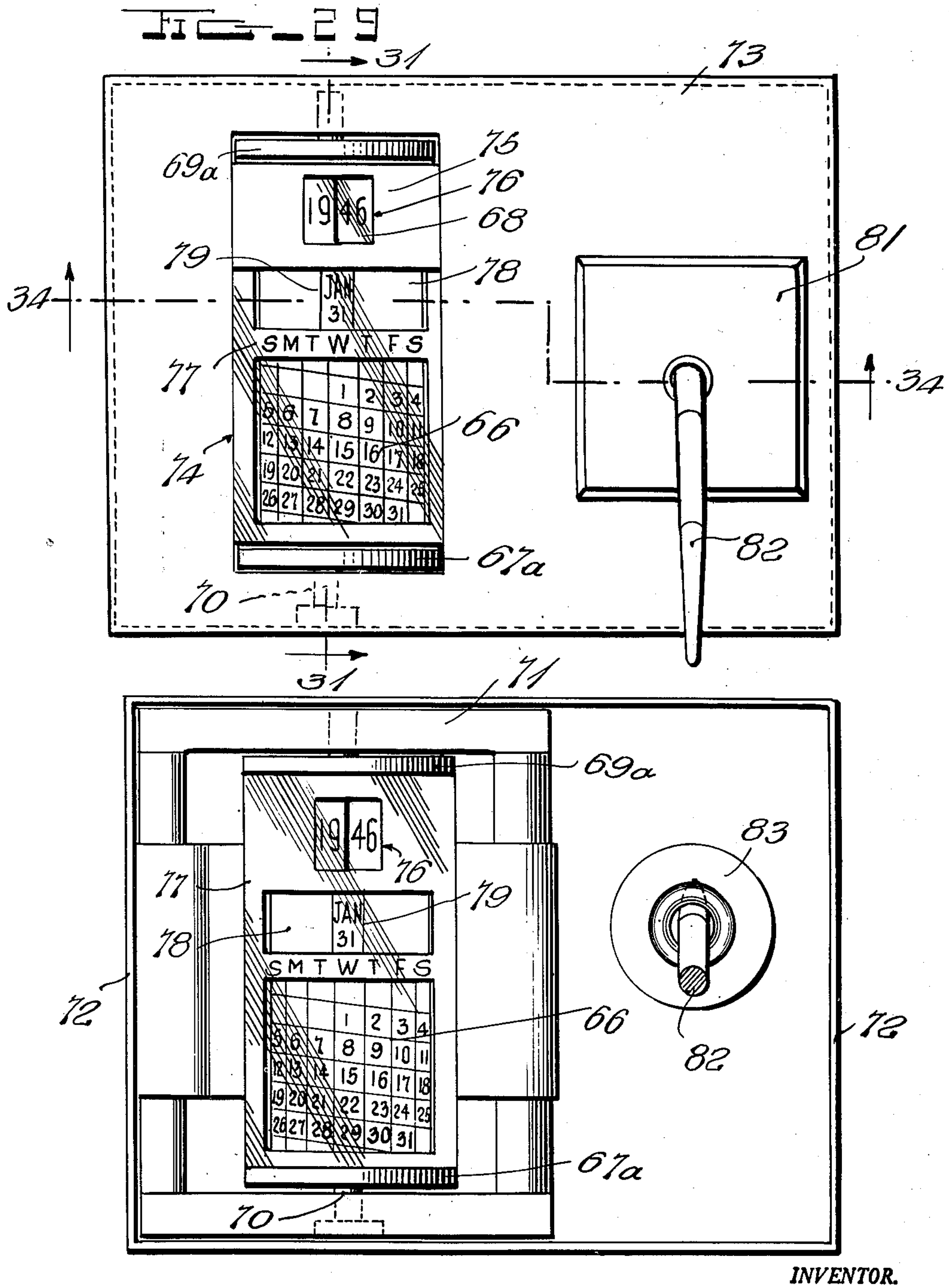
Figure 31:
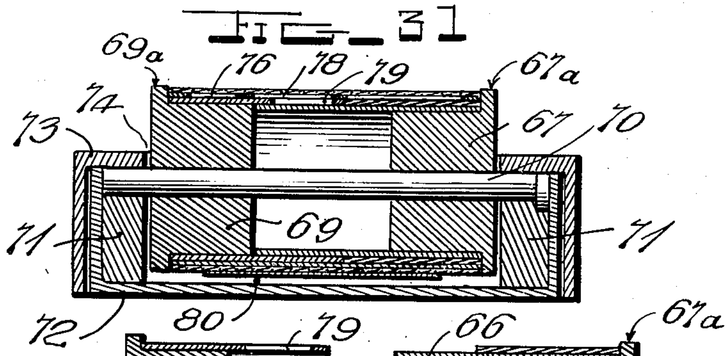
Figure 32:
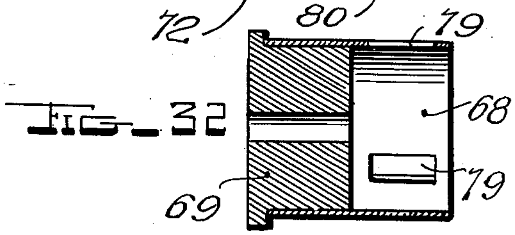
Figure 33:
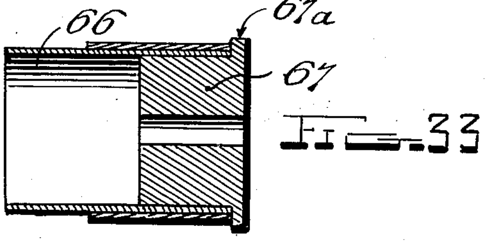
Figure 34:
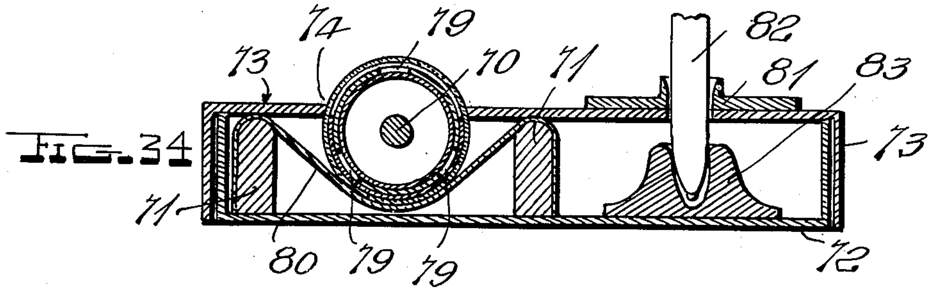
Figure 35:
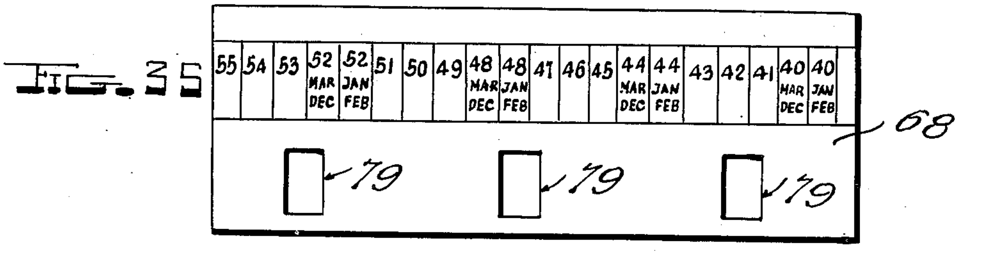
Figure 36:
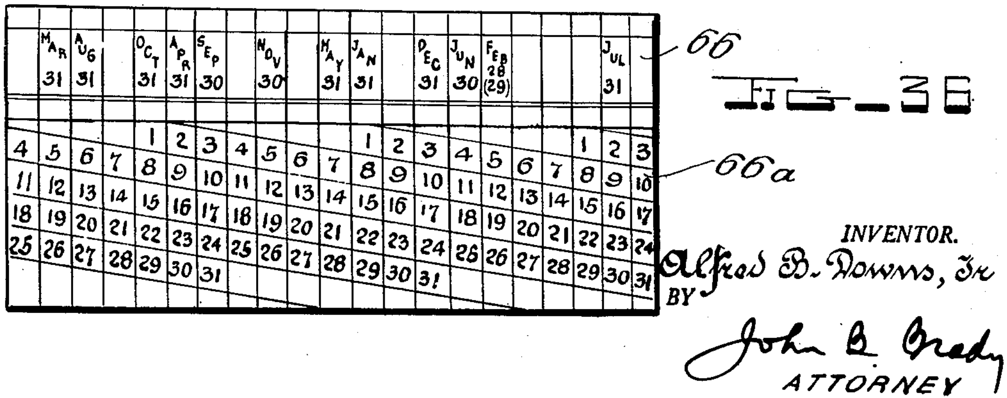

Other and further objects of my invention reside in a construction and arrangement for a perpetual calendar as set forth more fully in the specification hereinafter following, by reference to the accompanying drawings, in which:

Figure 1 illustrates the calendar of my invention applied to the back of an ordinary matchbox formed from thin sheet material, with the slidable portion of the matchbox moved to the left for displaying the calendar in the proper position in a selected month of a selected year; Fig. 2 shows the calendar with the slidable member thereof shifted to the right for displaying the calendar for another selected month in a selected year; Fig. 3 illustrates the calendar on Figs. 1 and 2 with the enclosing portion thereof reversed in position for the display of the calendar for a different year, and showing the matchbox moved to the left for displaying the dates of a particular month for the selected year; Fig. 4 is a view similar to the view shown in Fig. 3, but illustrating the matchbox moved to the right for displaying the date designations for a different selected month in the same year for which the designations indicated in Fig. 3 are displayed; Fig. 5 illustrates the designations arranged on the calendar in accordance with my invention, and applied to the rear of the matchbox illustrated in Figs. 1–4; Fig. 6 is a transverse sectional view taken substantially on line 6—6 of Fig. 1 and illustrating more clearly the manner in which the calendar designations carried by the rear of the matchbox are visible through the aperture arranged in the back of the cover of the matchbox; Fig. 7 is an elevational view of another form of calendar embodying the principles of my invention, in which a permanently arranged slide carries the calendar designations, and is movable within a cover including an aperture and a notch geometrically positioned to unmask designations of dates applicable to a particular month in a selected year, the view showing the slide moved to the left; Fig. 8 is a vertical transverse sectional view taken substantially on line 8—8 of Fig. 7; Fig. 9 is a horizontal sectional view taken substantially on line 9—9 of Fig. 7; Fig. 10 is an elevational view partially broken away and similar to the view shown in Fig. 7, but illustrating the slidable member of the calendar shifted to the right for displaying the dates applicable to another selected month in the year; Fig. 11 is a horizontal sectional view taken substantially on line 11—11 of Fig. 10; Fig. 12 is a front elevational view of the calendar of Figs. 7-11, but illustrating the reverse face thereof and showing the slidable member moved to the left for displaying the dates applicable to a particular month in another year, as distinguished from the year designated by the viewable face of the calendar as shown in Figs. 7 and 10; Fig. 13 is a fragmentary elevational view similar to the view shown in Fig. 12, but illustrating the slidable member of the calendar shifted to the right for displaying dates applicable to a selected month in the same year as that designated on the calendar as shown in Fig. 12; Fig. 14 is a schematic view illustrating how the form of the calendar of my invention shown in Figs. 7-13 may be carried on a chain for attachment to a key ring, watch chain, or other pocket piece; Fig. 15 is a front elevational view showing the application of the calendar of my invention and embodying two slidable members in the lid of a box such as a pen and pencil set box, jewelry case, compact case, traveling case, or other container; Fig. 16 is a transverse sectional view taken substantially on line 16—16 of Fig. 15; Fig. 17 is a perspective view of one of the slidable members used in the form of my invention shown in Fig. 15; Fig. 18 is a perspective view of the other of the slidable members used in the form of calendar shown in Fig. 15; Fig. 19 is a front elevational view of the calendar which is carried by the slidable member of Fig. 18; Fig. 20 is a front elevational view of the calendar that is carried by the slidable member of Fig. 17; Fig. 21 is a plan view of the cover of the case which houses the parts of the perpetual calendar in the form of my invention shown in Figs. 15-20; Fig. 22 is a front elevational view of a form of calendar of my invention as applied to an easel, mounted device, or a wall calendar, for a display of dates on any selected day in any month for any year for a predetermined period of years; Fig. 23 is a vertical sectional view taken substantially on line 23—23 of Fig. 22; Fig. 24 is a horizontal sectional view taken substantially on line 24—24 of Fig. 22; Fig. 25 is an elevational view of the calendar which is arranged for slidable movement within the casing illustrated in Figs. 22-24; Fig. 26 is an elevational view of another of the slidable members provided in the form of the perpetual calendar shown in Figs. 22-25; Fig. 27 is a vertical sectional view taken substantially on line 27—27 of Fig. 25; Fig. 28 is a vertical sectional view taken substantially on line 28—28 of Fig. 26; Fig. 29 shows the further modified form of perpetual calendar embodying my invention in which the dates of the calendar are arranged on a rotatable, cylindrical member housed within a desk set, and provided with an independently adjustable display member for indicating the year to which the selected dates carried by the changeable cylindrical member are applicable; Fig. 30 shows the perpetual calendar of Fig. 29 with the cover of the desk unit removed to illustrate more clearly the manner of mounting the perpetual calendar; Fig. 31 is a transverse sectional view taken substantially on line 31—31 of Fig. 29; Fig. 32 is a longitudinal sectional view taken through one of the rotatable parts of the perpetual calendar of Fig. 31; Fig. 33 is a longitudinal sectional view taken through the other of the rotatable parts of the perpetual calendar shown in Fig. 31; Fig. 34 is a vertical sectional view taken substantially on line 34—34 of Fig. 31; Fig. 35 is an elevational view of the year and month designation carried by the rotatable member of Fig. 32; and Fig. 36 is an elevational view of the perpetual calendar date and month designation strip carried by the rotatable member of Fig. 33.

I have developed the calendar of my invention in a variety of forms, all of which are based upon the same mathematical law which I have developed. It was desired to formulate a mathematical procedure whereby a person knowing a certain date (past or future) can determine the corresponding day of the week. The date Tuesday, January 1, 1901 was arbitrarily chosen as the base date and the year 1901 was assigned the number "1." Successive years were assigned numbers corresponding to their positions in the century with respect to the base year, plus the number of February 29's occurring between the base year and the date in question. The highest multiple of 7 contained in the resulting figure is subtracted to secure the year number. For the 19th century years the procedure is similar except that "2" is added to secure "year numbers" for the 19th century years.

January 1st being the first day of the month was assigned the number "1," as was the first day of every month. Successive days of the month were assigned numbers corresponding to their position in any week in the month with respect to the first day of the month (the remainder in the quotient day of the month divided by 7).

The days of the week were assigned numbers "1" through "7" beginning with Sunday as "1" and ending with Saturday as "7."

In order to establish numbers to represent the months, the following equation was set up and solved for the unknown:

Year number+month number+day of month number=day of week number

Month number=day of week number−year number−day of month number

Substituting in the above formula for Tuesday, January 1, 1901:

January=3−01−1=1

Thus January is assigned the number "1."

The month of January, having three days more than four full weeks, causes February 1st to fall three days of the week later than January 1st. Thus, if January 1, 1901 fell on Tuesday, February 1st fell three week days later, or on Friday (the sixth day of the week). Substituting in the formula for Friday, February 1, 1901:

February=(day of week number) 6 minus (year number) 1 minus (day of month number) 1 or: February=6−1−1=4

Thus February was assigned the number "4."

February's four complete weeks cause March 1st to fall on the same day of the week as February 1st (leap years excepted). It is readily seen that by substituting in the formula March would be found to have the same "month number" as February.

Thus March was assigned the number "4."

March has three days more than four full weeks, thus causing April 1st to fall three days of the week later than March 1st. April 1, 1901, then, fell on Monday which is the second day of the week. Substituting in the formula for Monday, April 1, 1901:

April=(day of week number) 2 minus (year number) 1 minus (day of month number) 1 or: April=2—1—1=0

Thus April was assigned the number "0."

April contains two days more than four complete weeks, thus causing May 1st to fall two week days later than did April 1. Inasmuch as April 1, 1901 was Monday, May 1st was Wednesday, the fourth day of the week. Substituting briefly in the formula for Wednesday, May 1, 1901:

May=4—1—1=2

Thus May was assigned the number "2."

May, having three "odd" days, causes June 1st to fall three week days later than May 1st. Then June 1, 1901 was Saturday, the seventh day of the week. And in the formula:

June=7—1—1=5

Thus June was assigned the number 5.

June has two "odd" days, thus July 1st was on Monday (week day #2). Therefore by the formula:

July=2—1—1=0

Thus July was assigned the number "0."

July has three "odd" days so August 1st was Thursday (week day #5). Therefore:

August=5—1—1=3

August was assigned the number "3."

August has three "odd" days, thus making September 1st fall on Sunday (week day #1 or #8 in this case to avoid a negative number.) In the formula:

September=8—1—1=6

Thus September was assigned the number "6."

September having two "odd" days caused October 1st to fall on Tuesday (3). In the formula:

October=3—1—1=1

Thus October was assigned the number "1."

October, with three "odd" days, caused November 1st to fall on Friday (6). In the formula:

November=6—1—1=4

Thus November was assigned the number "4."

November, with two "odd" days, caused December 1st to be on Sunday, week day #1 (the number 8 is used instead of 1 in order to avoid a negative result after substituting in the formula). In the formula:

December=8—1—1=6

Thus December was assigned the number "6."

Summarizing the numbers established to represent the months, I have:

0—April and July
1— January and October
2—May
3—August
4—February, March and November
5—June
6—September and December Having now assigned numbers to each month it is possible to revert to my original objective of determining the day of the week corresponding to any given date.

For example, if it is desired to know the day of the week on which July 4, 1905 fell, it is now possible to substitute in the original formula using my assigned numbers. Substituting in the formula for July 4, 1905:

Year number + month number + day of month number=day of week number 6+0+4=10

10=one complete week and three days

Therefore: July 4, 1905 was the third day of the week, or Tuesday.

*Example #2.*—It is desired to know the day of the week on which falls October 23, 1949. Solution: There has been a leap year every four years since the base date, making twelve leap years. Add 12 to 49 to get 61

Reduce by the highest multiple of 7:

| | |
|---|---|
| | 61 |
| | −56 |
| Year number | 5 |

Referring to summary above: Month number 1

Day of month number reduced by the highest multiple of 7: 23—21 ---------------- 2

Substituting in the formula:

year + month + day = day of week
5 + 1 + 2 = 8
−7 (reduced by highest multiple of 7)
1 Sunday I have developed the calendar of my invention in several different mechanical forms to add these combinations of numbers from 0 to 7 and to indicate the remainder when the sum is reduced by the highest multiple of 7.

In all of the various forms of my perpetual calendar I have substituted actual years, month names, days of the month, and days of the week, for the assigned numbers, but it will be readily seen that the scope of the calendar is unlimited because of the fact that the formula can be applied to any era and the various forms of my device all solve the fundamental equation.

In the form of my invention illustrated in Fig. 1, the calendar date designations are imprinted as represented at 1, on the back of the matchbox illustrated at 2. The matchbox is formed from thin sheet material provided with the conventional cover 3 of thin sheet material, the rear of which is provided with an aperture 4, through which the dates of the month designated on the calendar 1 are displayed. The box and associated cover constitutes a thin walled parallelepiped as hereinafter defined in the claims. The aperture 4 in the rear of cover 3 is provided with notches 5 and 6 which extend the full width of the columns designating the dates of the month displayed on the calendar 1, and which extend transversely of the cover 3 for a distance sufficient to unmask selected month designations which appear on the calendar 1 as the cover 3 is moved in either direction with respect to the matchbox 2. The size of the aperture 4 and the depth and width of the notches 5 and 6 are proportioned so that the structural rigidity or strength of the thin walled box cover is not impaired beyond a safe limit. The notches 5 and 6 are offset or staggered with respect to each other, so that notch 5 occupies the fourth position according to the days of the week from the extreme left peripheral edge of the aperture 4, whereas the notch 6 occupies the third position from the same reference marginal line. A designation of the days of the week is printed in a horizontal position along the cover 3 in the form of abbreviations, such as Sunday, Monday, Tuesday, Wednesday, Thursday, Friday and Saturday represented by the letters S, M, T, W, T, F and S respectively, indicated generally at 7. This horizontal designation of days of the week is located between the extreme edge of the cover 3 and the dimensional limit of the notch 5. Adjacent these day designations 7, I imprint a year designation 8 on the cover 3, such as, for example, the year 1949. These designations are all related to notch 5. Adjacent the reverse marginal edge of cover 3 I provide a row of similar day designations 10, related to the staggered or offset notch 6, and similarly the year designation incident thereto is imprinted at 11, such as represented by 1950. Notches 5 and 6 have a width corresponding to the columnar width of the column imprinted at 1 on the rear of the box 2, and accurately align the name of the month which is unmasked by movement of the box 2 with respect to cover 3, for visually aligning dates appropriate to a particular month within the aperture 4.

The calendar, including the date designations printed at 1, with the month designations printed at the head of certain selected columns as represented at Fig. 5, is arranged in six horizontal rows of thirteen graduations in length, in such a position as to be visible through the aperture 4. The top date row is numbered 1 through 7, left to right, beginning at the 7th graduation; the second, third and fourth rows have all thirteen graduations numbered, 2 through 14, 9 through 21, and 16 through 28 respectively; the fifth row is numbered 23 through 31 beginning at the first graduation and ending on the ninth graduation; the bottom row is numbered 30 and 31 on the first and second graduations respectively.

On the aforementioned sliding member is also imprinted the month of the year, spaced according to the graduations chosen for the calendar; in an order according to their "month number" (right to left); and placed so as to be visible through aperture 4 as the second member is slid from one extreme position through seven graduations to the other extreme position.

In order to determine the month to be printed in the extreme right graduation, determine the proper "month number" by subtracting the selected "year number" from 7. (Determine the year number from the formula.) The month names are substituted for their corresponding numbers, the numbers being arranged right to left, and 6 being followed with 0.

In arranging the date designations as shown in Fig. 5 in association with headings designating the months, five of the columnar headings are dual headings, whereas three of the columnar headings are single headings. The center of the imprinted calendar has a heading designating the month of June. The columns to the left include dual headings. The first column to the right includes a triple heading, and this is followed by two single headings, and the heading of the final column at the right hand end is a repetition of the initial column at the left hand end, as follows:

| | | | | | | | |
|---|---|---|---|---|---|---|---|
| Jan. Oct. | Apr. July | Sept. Dec. | June | Feb. Mar. Nov. | Aug. | May | Jan. Oct. |

The imprint of the calendar dates is symmetrical on either side of the June column, and the portion of the column I have designated at 12 is a duplication of the portion of the column I have designated at 13, with the exception that the right hand portion of the column is displaced vertically with respect to the horizontal rows of the left hand portion of the calendar, with the central column forming the differentiating column therebetween.

By virtue of this arrangement, the cover 3 may be slid to a multiplicity of positions, with the box 2 projecting from the left of cover 3, as represented at Fig. 1, or in the reverse position, with box 2 projecting from the right hand end of cover 3 for displaying the dates of a selected month. As represented in Figs. 3 and 4, the cover 3 is reversed so that notch 6 is employed in a position offset with respect to notch 5, and the dates for any month in another year, for example the year 1950, displayed.

The same principles governing the calendar of Figs. 1–6 are embodied in the form of my invention illustrated in Figs. 7–14. In this arrangement, however, the card 14, which carries the calendar designations 1 imprinted thereon, is interlocked with the enclosing cover 15, and is not intended to be removed therefrom. The cover 15 is in the form of sheet plastic, forming a narrow walled casing having lugs 16 adjacent one corner thereof, forming an attachment means for the chain 17 which may be connected to a key ring, or attached inside a lady's purse, or connected with a watch chain, etc. The plastic cover 15 is longitudinally slotted along one extremity thereof, as represented at 18, for a distance corresponding to the limits of the apertures 19 and 20 in opposite sides of the casing 15. A lug 21, extending from slidable calendar card 14, projects through the slot 18, so that the longitudinal movement of calendar card 14 is restricted, both toward the left, as represented at Figs. 7, 8 and 12, and toward the right, as represented in Figs. 10, 11 and 14. The two opposite sides of the plastic casing 15 are provided with notches designated at 22 and 23, each having a width corresponding to the width of the columns on calendar card 14, and having a transverse dimension sufficient to unmask the designation of the month carried by the calendar card in any one of the positions of the calendar card. The year designation carried by one side of the plastic casing 15, as shown at 24, corresponds to the year designation 25 carried by the calendar card 14. Correspondingly, on the reverse side of the plastic casing 15 the year designation 26 corresponds to the year designation 27 on the calendar card 14. The days of the week are designated by abbreviations on each side of the plastic casing 15 between the peripheral edge of the case and the notches 22 and 23 in positions aligned with the columns on the calendar card 14. The calendar card 14 is constructed in a manner similar to the card illustrated in Fig. 5.

In the form of my invention shown in Figs. 15–21 there are two movable members provided, one of which controls the year and month designation independently of the slidable member controlling the date variation. Reference character 28 designates the top of a case which is hinged at 29 to the bottom portion of a case designated at 30, and which is useful for a variety of purposes, such as a box for a pen and pencil set, a jewelry case, compact case, traveling case, or other form of container. As a pen and pencil box I have shown the bottom of the box 30, shaped to receive a pen and pencil set represented at 31 and 32, over which a hinged lid 28 is adapted to move. The hinged lid 28 has a centrally arranged aperture 33 therein for the display of the calendar cards, which I have represented at 34 in Fig. 19, and 35 in Fig. 20. The calendar card 34 is identical in its arrangement to the calendar designations 1 in Fig. 5, except that the headings, including month designations and year designations, are transferred to the second card 35. The calendar card 34 is carried by a slide 36 shown in Fig. 17, having a longitudinally extending bead 37 therein, and an upstanding lug or finger grip member 38. The lug or finger grip member 38 projects through longitudinally extending slot 39 in the top of the casing 28, facilitating the adjustment of slide 36 linearly within the case. The slide 36 serves as a carrier for the card 35 of Fig. 20 carrying vertical column designations of years, in this particular instance shown as the years 1946 through 1951, and also columns showing the designation of months. Provision is made in this instance for also indicating the number of days in each month, particular attention being given to the month of February by providing designations for both twenty-eight and twenty-nine day months. It will be observed that there are two intermediate columns for the year 1948, with designations under one of said columns for September and January, and designations under the other of said columns for April and July. A repeat arrangement is provided on each side of the central column for the year 1948, so that the portions of the card 35 which I have represented at 40 are symmetrical with the portions of the card 35 which I have designated at 41.

The card 35 has a slot 42 therein, which is engaged over the lug or finger grip 38, enabling card 35 to slide longitudinally beneath the cover 28, so that the horizontal row of year designations may be successively displayed through aperture 43 in the top of cover 28, and matched up with the year designation 44 carried by the cover 28. Cover 28 also carries the horizontal row of designations 45, indicating the days of the week. Month designations carried by card 35 are displayed at the top of the calendar card 34, through the slot 46 therein centrally disposed in card 34, and having a width sufficient to unmask selectively the columns on card 35 as card 34, carried by slide 47, is selectively positioned longitudinally of the case. The portions of card 34 represented at 34*a* and 34*b* serve as masks over the non-selected month designations carried by card 35. The card 35, supported on slide 47, is manipulated by the lug or finger grip 48 which projects through the longitudinally extending slot 49 in the cover 28. Thus, a bead 50 in slide 47 coacts with the bead 37 in slide 36, enabling these slides to be guided in their various positions of longitudinal adjustment for selecting the appropriate group of calendar dates for a particular month and year.

As the second slide 36 is slid through its seven positions, the calendar appearing in aperture 33 corresponds to the month appearing in aperture 43 for the year chosen.

All forms of my calendar are based on the same rule or discovery, and differ only in mechanical design and construction. By varying methods of construction, any number of years may be included, but in all forms of my invention the years are spaced according to the chosen graduation (two graduations are necessary for leap years, one for January, two for February, and one for March through December); arranged in numerical succession according to their "year number" (either left to right or right to left); some one year selected and the "year number" determined by formula; the device set so that Sunday is the first day of the month; the "year number" subtracted from 7 results in the "month number" appropriate for that particular setting; the months arranged in order of their "month numbers" about the month determined in the preceding step (either left to right or right to left, whichever is selected to prove the formula: Year number+month number+day of month number=day of week number) and spaced so as to fall on their corresponding numbered graduation.

The calendar card 34 indicates thirty-one days. In applying the formula the last day, when applicable for any given month, is disregarded. Also, the last three days for February are disregarded in applying the formula, except in leap years, where thirty and thirty-one are disregarded. Each month graduation may include a number to indicate the number of days in that month, as I have indicated, for example, in Fig. 20.

In Figs. 22–28 I have illustrated an application of my invention to an easel type calendar for mounting on the desk or for wall mounting. In this form of my invention a flat casing, which may be formed from plastic, is provided, as represented at 51, having a frame portion 52 closed by a back member 53, and forming a housing for two horizontally slidable members 54 and 55, illustrated more clearly in Figs. 25 and 26 respectively. In order to accommodate these members, the front 51 of the calendar is provided with a multiplicity of apertures, which I have represented at 56 and 57, for displaying the year designations. The slot 58 permits slidable adjustment of the finger grip or actuator 59, attached to card 55, shown in Fig. 26, for adjusting the position of the designation for both the year and the month. The aperture 60 permits the display of the month designation by movement of the card 55 with unmasking aperture 61 therein. The portions of card 55 on either side of unmasking aperture 61, represented at 55*a* and 55*b*, serve to entirely cover the month designations carried at the top of card 54 in the position 54*a*, permitting only the selected month to be unmasked, as represented in Fig. 22. The slot 62 in calendar 51 serves for the passage of slidable finger grip or actuator 63, carried by card 54. The largest aperture 64 in calendar 51 provides for the display of the date designations 54*b* on the calendar card. It will be observed that the same rule of arranging the years and the dates of the month applies in the form of my invention illustrated in Figs. 22–28, as that explained in connection with the previous forms of my invention. The calendar card 54 is reinforced by the backing sheet 54*c* which coacts with the backing sheet 55*c* of the slide 55 in horizontal linear adjustment of the components forming the calendar. The dependent portion of the card 55, which projects beyond the backing sheet 55*c*, extends over the upper face of the card 54, rendering visible the selected month through the unmasking aperture 61.

Suitable supporting means are provided for the calendar 51, as represented in Fig. 23 by the easel 65.

In the form of my invention illustrated in Figs.

29–36, I wrap the calendar card 66, which designates the months and the dates in each month, around the cylindrical member 67. The calendar card 68 designating the year, is wrapped around the cylindrical member 69. The cylindrical members 67 and 69 are mounted on a member 70 which is supported at opposite ends in the cradle frame 71. The cradle frame 71 may be mounted within the base 72 of the desk set. A top cover member 73 for the desk set, fits over the base 72 and is suitably apertured at 74 for projection therethrough of the cylindrical members 67 and 69 carrying the cards 66 and 68 respectively. A suitable mask is provided coextensive with the cover 73, as represented at 75, and is apertured at 76 for the display of the year designations carried by card 68. An additional mask is provided over both of the cylindrical members 67 and 69 and the cards 66 and 68 carried thereby, as represented at 77. This mask is apertured at 78 to permit the display of the month designation, which is unmasked by spaced unmasking apertures 79 carried by the lower portion of the card 68. The mask 77 also has a transversely extending band which curves upwardly through the cover 73 of the desk set, and serves as a designation strip for the symbols designating the days of the week, S, M, T, W, T, F, S, and which align with the columnar arrangement of the days of the week on the portion 66*a* of the card 66 shown in Fig. 36. The vital distinction in the form of the card shown in Fig. 36 over the forms of the date cards employed in the other forms of my invention, is that the date designations are arranged in spiral rows, as clearly represented in Fig. 36, facilitating the registration of the required dates for designated months and designated years.

Each of the cylindrical members 67 and 69 are provided with finger-engaging flanges 67*a* and 69*a*, which enable the cylindrical members to be manually turned from the top of the desk set for adjusting the perpetual calendar to the required position. To counteract undue strain upon the parts of the rotatable structure, I provide auxiliary support for the rotatable members in the form of a band 80, which is suspended from opposite sides of the cradle frame 71, supporting the rotatable members during the course of turning thereof.

The desk set includes a mounting for the writing set or pen holder designated at 81, carrying removable pen 82 which may be supported in the holder 83 carried in the base of the desk set at 82.

While I have designated my invention in certain of its preferred embodiments, I realize that the perpetual calendar of my invention may be embodied in many other forms, which will be readily apparent from a consideration of the foregoing specification. The important consideration is the application of the formula which I have devised, to various forms of the perpetual calendar. Accordingly, I desire that it be understood fully that my invention as set forth herein is to be considered in the illustrative sense and not in the limiting sense, and that no limitations upon my invention are intended other than may be imposed by the scope of the appended claims.

What I claim as new and desire to secure by Letters Patent of the United States is as follows:

1. In a calendar, a box formed of thin sheet material substantially in the shape of a parallelepiped, a cover of thin sheet material conforming with the contour of said box and open at each end and enveloping said box and enabling said box to slide to the right or left through said cover, one wall of said cover having a central perforated portion therein and having extended perforations projecting from the perforated portion, but offset transversely with respect to each other, a calendar including month designations and date designations carried by the bottom of said box, the date designations being adapted to be displayed through the perforated portion in the cover of said box and the month designations being adapted to be displayed through the extended perforations projecting from the central perforated portion in said cover, and symbols designating the days of the week carried by said cover in columnar registration with the date designations carried by the bottom of said box, the central perforated portion of said cover and the extended perforations projecting therefrom being proportioned so as not to impair the rigidity of said cover formed from thin sheet material.

2. A calendar, comprising a box formed of thin sheet material substantially in the shape of a parallelepiped slidable to the right and left through an enveloping box cover of thin sheet material open at both ends and conforming with the contour of said box, a calendar carried by the bottom of said box, said box cover portion having a central perforation therein with a pair of transversely offset extended perforations projecting therefrom contiguous with the linear edges of the central perforation in said cover portion, a calendar carried by the bottom of said box including marginal month designations and central daily date designations, said marginal month designations being masked or unmasked by the linear edges of the central perforation and the extended perforations in said enveloping box cover, and day of the week designations carried by said box cover along the marginal edges thereof in columnar registration with the date designations carried by said box, the central perforated portion of said cover and the extended perforations projecting therefrom being proportioned so as not to impair the rigidity of said cover formed from thin sheet material.

3. A calendar as set forth in claim 2, in which said box cover is reversible in position with respect to the bottom of said box for aligning either of said offset extended perforations in said box cover portion with the columnar date designations carried by the bottom of said box.

4. A calendar as set forth in claim 2, in which the date designations on said calendar comprise a substantially central vertical column of figures displayed through the central perforation in said box cover, and two identical groups of date figures disposed on opposite sides of said central column, with one group of said date figures offset in horizontal rows, for a distance equal to one horizontal row above the other group of date figures for visual display through the central perforation in said box cover.

5. A calendar comprising a box-like thin walled self-sustaining receptacle carrying a calendar card on the bottom thereof, a thin walled self-sustaining closure for said receptacle slidable in either of two directions over said thin walled box like receptacle a calendar card cover member carried by said closure with respect to which said calendar card has limited, translatory movement, said calendar card carrying columnar arrangements of month designations and date designations on adjacent portions thereof, with the month designations on one portion of said card appropriate to the date designations for a particular year, while the month designations on the adjacent portion of the card are arranged with respect to said date designations in a manner appropriate for a different year, said cover member having a central aperture extending through one side thereof for the visual display of the date designations carried by said calendar card, and masking and unmasking portions in said cover member contiguous with said central aperture said unmasking portions being transversely offset with respect thereto for visual display of the month designations carried by said calendar card as said calendar card is moved to the right or left through said cover member, day of the week designations carried by said cover member in selectively registerable alignment with the columnar date designations carried by said calendar card and year designations carried adjacent opposite edges of said cover member for selectively registering said cover member with respect to the calendar card carried by the bottom of said receptacle, the central aperture in said cover member and the masking and unmasking portions being proportioned so as not to impair the rigidity of said cover member.

6. A calendar comprising a box like thin walled self-sustaining receptacle carrying a calendar card on the bottom thereof, a thin walled self-sustaining closure for said receptacle slidable in either of two directions over said thin walled box like receptacle, a calendar card cover member carried by said closure with respect to which said calendar card has limited, translatory movement, said calendar card carrying columnar arrangements of month designations and date designations on adjacent portions thereof, with the month designations on one portion of said card appropriate to the date designations for a particular year, while the month designations on the adjacent portion of the card are arranged with respect to said date designations in a manner appropriate for a different year, said cover member having a central aperture extending through one side thereof for the visual display of the date designations carried by said calendar card, and masking and unmasking portions in said cover member contiguous with said central aperture, said unmasking portions being transversely offset with respect thereto for visual display of the month designations carried by said calendar card as said calendar card is moved to the right or left through said cover member, day of the week designations carried by said cover member in selectively registerable alignment with the columnar date designations carried by said calendar card, the day of the week designations being disposed in horizontal rows adjacent the major edges of the central aperture in said cover member, said rows reading in relative inverted relation and year designations carried by said cover member adjacent the peripheral edges thereof, said year designations reading in inverted relation to each other, said day of the week and year designations being registerable with the calendar card carried by the bottom of said receptacle, the area of the central aperture in said cover member and the size of the masking and unmasking portions being proportioned so as not to impair the structural rigidity of said cover member.

ALFRED B. DOWNS, Jr.

REFERENCES CITED

The following references are of record in the file of this patent:

UNITED STATES PATENTS

| Number | Name | Date |
|---|---|---|
| 475,501 | Hawkins | May 24, 1892 |
| 1,692,392 | Stevenson | Nov. 20, 1928 |
| 2,025,636 | Block | Dec. 24, 1935 |
| 2,051,264 | Maddock | Aug. 18, 1936 |
| 2,401,162 | Kaufman | May 28, 1946 |
| 2,499,329 | Potter | Feb. 28, 1950 |